United States Patent [19]

Laude et al.

[11] Patent Number: 4,675,860
[45] Date of Patent: Jun. 23, 1987

[54] COMPACT WAVELENGTH MULTIPLEXER-DEMULTIPLEXER WITH VARIABLE FILTRATION

[75] Inventors: Jean-Pierre Laude, Saclas; Jean Flamand, Chatenay Malabry; Jean-Claude Gautherin, Sucy-En-Brie, all of France

[73] Assignee: Instruments S.A., Paris, France

[21] Appl. No.: 514,386

[22] Filed: Jul. 15, 1983

[30] Foreign Application Priority Data

Jul. 16, 1982 [FR] France .................................. 82 12439

[51] Int. Cl.$^4$ .......................... H04B 9/00; H04J 1/00
[52] U.S. Cl. .................................... 370/3; 350/96.15; 350/96.18; 350/96.19
[58] Field of Search ..................... 370/3, 1; 350/96.15, 350/96.16, 96.18, 96.19

[56] References Cited

U.S. PATENT DOCUMENTS

| 4,244,045 | 1/1981 | Nosu et al. | 455/612 |
| 4,449,782 | 5/1984 | Korth | 350/96.19 |
| 4,474,424 | 10/1984 | Wagner | 350/96.16 |
| 4,479,697 | 10/1984 | Kapany et al. | 350/96.19 |

FOREIGN PATENT DOCUMENTS

| 80887 | 6/1983 | European Pat. Off. | 370/1 |
| 148390 | 5/1981 | Fed. Rep. of Germany | 350/96.16 |

OTHER PUBLICATIONS

Soares—Self Imaging Devices—SPIE vol. 213, Optics and Photonics Applied to Comm & Proc. 1979, pp. 40–43.

Primary Examiner—Joseph A. Orsino, Jr.
Attorney, Agent, or Firm—Handal & Morofsky

[57] ABSTRACT

Multiplexer-demultiplexer device for wavelengths in an optical transmission fiber (6) for introducing therein a wavelength from an emitter (18) and for extracting wavelengths therefrom towards receivers (19), comprising several spherical mirrors (13–14) at least one of which (3) is a selective mirror with dielectric layers, selected to segregate by transmission or reflection a band containing only one of the wavelengths transmitted, or to be transmitted, by the fiber (6). The invention applies to telecommunications employing optical fibers.

12 Claims, 8 Drawing Figures

COMPACT WAVELENGTH MULTIPLEXER-DEMULTIPLEXER WITH VARIABLE FILTRATION

CROSS-REFERENCE TO RELATED APPLICATIONS

This application is related to simultaneously filed U.S. patent application Ser. No. 456,390 of Laude entitled Optical Multiplexing Device for Multiplexing or Demultiplexing Wavelengths, U.S. Ser. No. 452,481 entitled Wavelength Selector filed Nov. 23, 1982 of Laude, and U.S. Ser. No. 247,440 entitled Monochromator filed Mar. 25, 1981 but now abandonded of J. P. Laude, one of the inventors herein, the disclosures of which applications are incorporated herein by reference.

FIELD OF THE INVENTION

The present invention relates to a multiplexer-demultiplexer of wavelengths in an optical transmission fiber, which is more particularly intended to form an end component in a telecommunication system employing optical fibers.

In such a system, each information is emitted in the form of a modulated light and is then introduced into the end of an optical transmission fiber, and then recovered at its other end to be collected by a receiver which reconstitutes the information.

BACKGROUND OF THE INVENTION

Telecommunication systems using optical fibers need generally to be designed for the transmission of information in both directions, the end components serving therefore both for introducing into the fiber at least one signal from at least one emitter placed at the same end of the fiber, and for extracting therefrom and separating the signals originating from emitters placed at the other end. The various signals, in either direction, are of course carried by lights of different wavelengths, each generally occupying only a narrow band of wavelengths.

The end components are therefore traversed by lights differing in wavelengths and, above all, differing greatly in intensity. Thus the lights which are to enter the end of the fiber are very intense because they come from emitters placed at this same end of the fiber, while the various lights which are received are attenuated by extended travel in the fiber. Very different levels of intensity are also observed among the signals which are received, depending on the power of the emitters and or the transmission distance.

The receivers are designed to be capable of operation at very low optical levels in view of the normal attenuations in the transmission fibers, and are therefore particularly sensitive to any stray light originating, for example, from nearby emitters or even from other lights which are received and which have retained a higher intensity.

As a result, one and the same end component may need very different degrees of filtration, for example, to prevent the outputs to the receivers being perturbed by the reflected or diffused stray lights derived from the intense light from nearby emitters, to separate properly wavelengths having similar attenuation, or to segregate wavelengths which are difficult to filter. Most frequently, the greater the attenuation of a signal arriving at the end of a transmission fiber, the more complete must be the filtration of its wavelength band in the end component. Moreover, it can happen that the filtration of a particular wavelength must be specially improved on account of specific difficulties in filtering it with usual external means.

The present invention makes it possible to produce, in one and the same component, different degrees of filtration for different wavelengths or wavelength bands, and therefore permits better adaptation of the filtrations to the specific characteristics of the various wavelengths which are to be processed.

SUMMARY OF THE INVENTION

The invention therefore relates to a multiplexer-demultiplexer device for wavelengths in an optical transmission fiber, intended to be used at one end of the fiber to introduce therein a light from an emitter, and-/or to extract therefrom and to separate, towards receivers, lights originating from emitters placed at the other end of the transmission fiber, the link between the device, on the one hand, and the emitters or receivers, on the other hand, also being formed by optical fibers.

According to the invention, the device comprises several spherical mirrors, at least one of which is a selective mirror with dielectric layers, the mirrors being arranged in series in the optical path of the beams emerging from the transmission fiber, or converging the rest, each selective mirror being selected to segregate by transmission or reflection a band containing only one of the wavelengths transmitted by the fiber.

According to one embodiment of the invention, the ends of the transmission fiber and of the reception or emission fibers are arranged close to the centers of the spherical mirrors.

According to another embodiment of the invention, the end of the transmission fiber is arranged in the non-reflecting central zone of a reflecting return system, the end of at least one of the reception or emission fibers being arranged on the opposite face of the device relative to the transmission fiber, and similarly in a non-reflecting central zone.

According to yet another embodiment of the invention, the end of the transmission fiber and that of at least one of the reception or emission fibers are arranged close to the focus of at least one of the spherical mirrors, and in the non-reflecting central zone of a plane return mirror.

The invention will be better understood with reference to a series of embodiments which are given by way of example and shown in the attached drawings which are all simplified optical diagrams.

Figure 3:
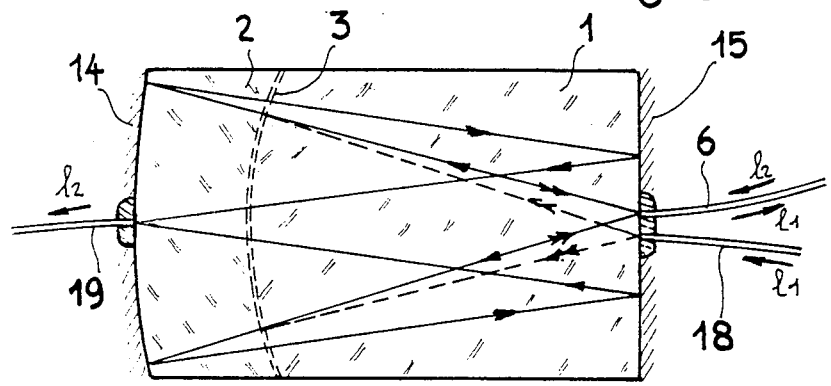
Figure 4:
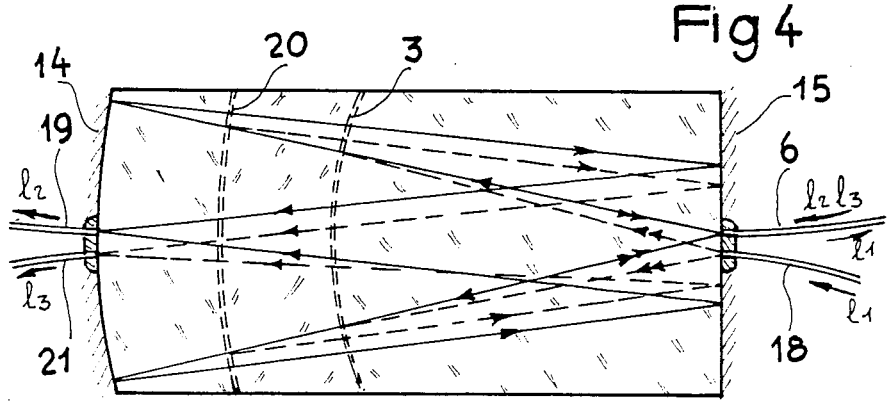
Figure 5:
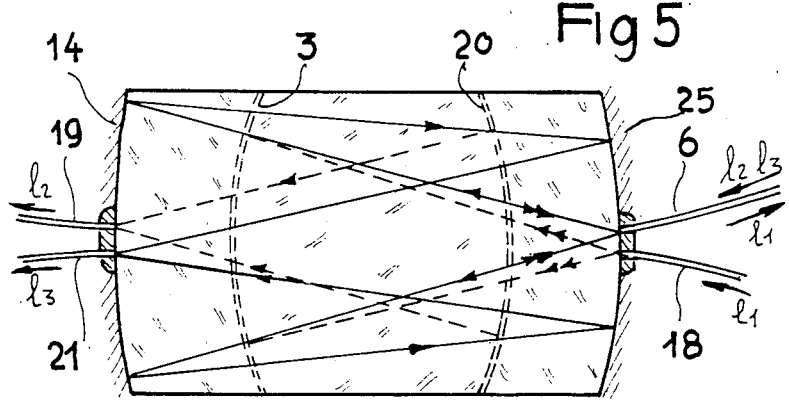
Figure 6:
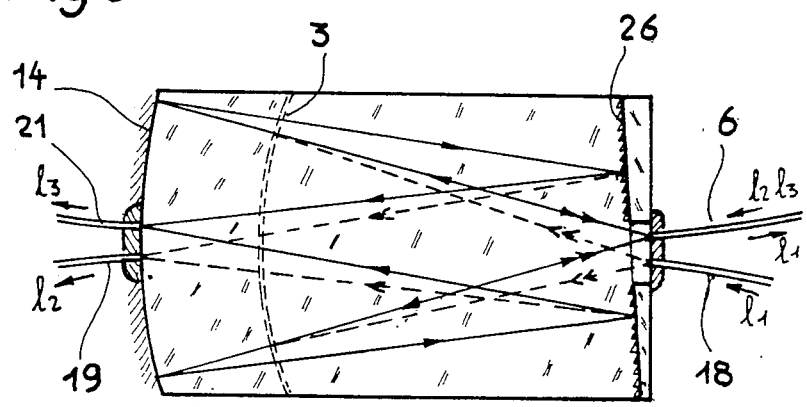

FIGS. 3 to 6 shows configurations in which some optical paths pass completely through the device and make it possible to obtain an optical segregation of certain outputs. The device of FIG. 3 comprises two spherical mirrors and a plane return mirror. That of FIG. 4 comprises three spherical mirrors and a plane return mirror. FIG. 5 shows an alternative form of the preceding device having a different relative arrangement of the spherical mirrors, and a return mirror which is also spherical. FIG. 6 is simialr to FIG. 3, but the return mirror is replaced in it by a grating for diffraction by reflection.

Figure 7:
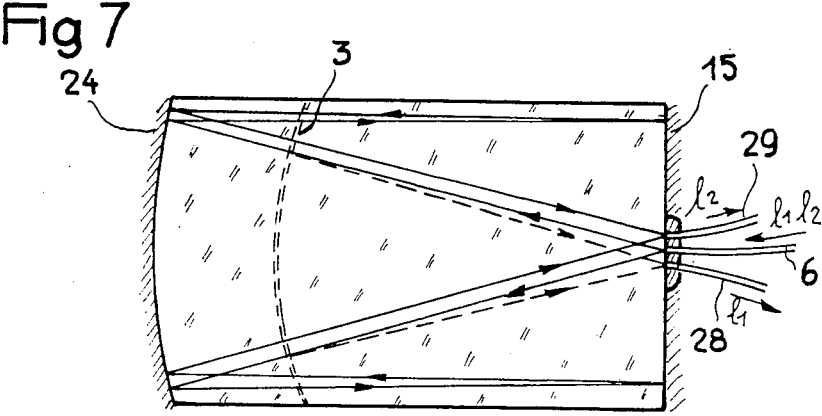

FIG. 7 shows a configuration with two spherical mirrors and a plane return mirror, in the case where the ends of the transmission fiber and of the reception or emission fibers are close to the foci of the mirrors.

Figure 8:
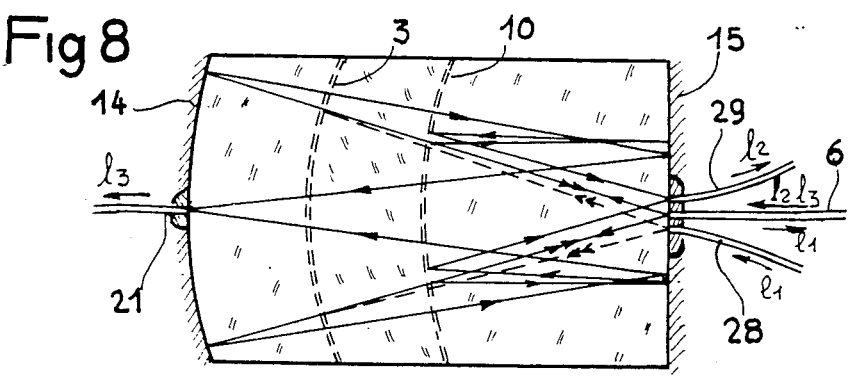

FIG. 8 shows an embodiment comprising a combination of the various possibilities of preceding configurations.

Figure 1:
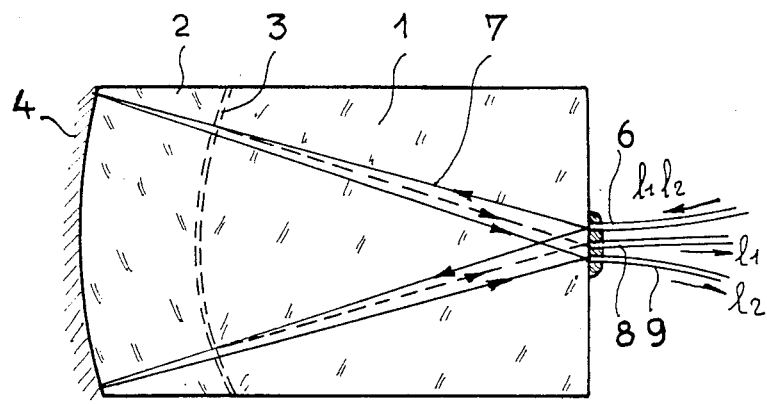
FIG. 1 shows a configuration with two spherical mirrors, in which the ends of the transmission fiber and of the reception or emission fibers are close to the center of the mirrors.
Figure 2:
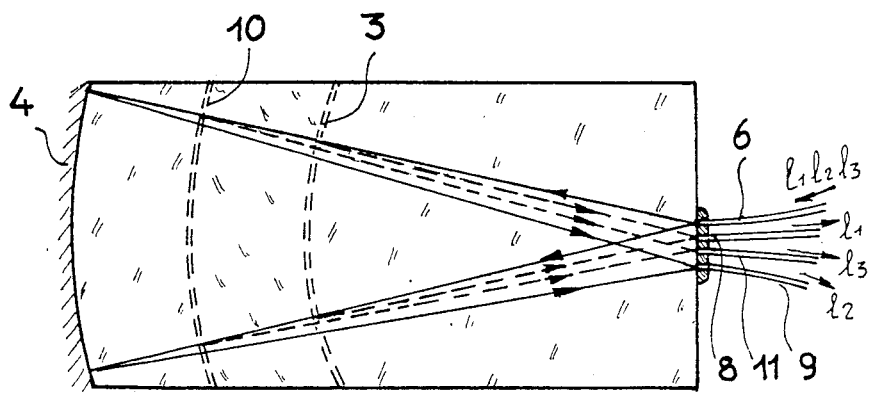
FIG. 2 shows a configuration which is similar to the preceding one but comprises three spherical mirrors.

Reference will be made first of all to FIGS. 1 and 2 which show devices whose configuration makes it possible to separate respectively two or three wavelengths originating from a transmission fiber.

According to FIG. 1, the device consists of two bonded transparent blocks 1 and 2 with the same index. A selective mirror 3 with dielectric layers is formed on the spherical surface of separation, while the other face of the block 2 forms a spherical mirror 4 which can be totally reflecting. The end of the transmission fiber 6 which transmits the wavelengths $L_1$ and $L_2$ from a distant emitter is situated in the immediate vicinity of the common center of the spherical mirrors 3 and 4. The number and composition of the dielectric layers of alternately low index and high index which form the selective mirror 3 are in this case determined so that the mirror 3 reflects only a wavelength band containing $L_1$, while remaining transparent for the other wavelengths including $L_2$. In the complex beam 7 originating from 6, only the light $L_1$ is reflected by the mirror 3 which focuses it in return stigmatically on the receiver fiber 8 which itself is also in the immediate vicinity of the center of 3 and hence close to 6. The remainder of the complex beam 7, namely the wavelength $L_2$, crosses the mirror 3 without deflection to be reflected by the mirror 4 which focuses it in return stigmatically on the other receiver fiber 9.

It can be seen that in this case the light $L_1$ undergoes only one filtration, on being reflected at 3, whilst the light $L_2$ undergoes two filtrations in its two passages of the mirror 3. The optical path of $L_2$ can therefore be reserved for the wavelength which is, for example, the weakest in intensity or the most difficult to filter.

The selection could be improved further, for example if the fiber 6 transmitted stray lights of wavelengths different from $L_1$ and $L_2$, by making the mirror 4 also into a selective mirror with dielectric layers, reflecting for one wavelength band containing $L_2$ and transparent for another band containing the stray light; the latter would then be lost by passing through the mirror 4.

It will also be noted that this device can be employed, by reversing the directions of the optical paths, as a multiplexer for introducing into the transmission fiber 6 lights coming from nearby emitters and arriving in this event via the fibers 8 and 9.

The device can also be used both to introduce the wavelength $L_1$ into 6 and to collect at 9 the wavelength $L_2$ originating from the other end of the fiber 6. Most frequently it will be preferable to reserve the short optical path by reflection at the mirror 3 for the emission, and the path with more complete filtration for the reception of the wavelength coming from the transmission fiber.

FIG. 3 differs from the preceding one only by the presence of an additional selective mirror 10, thereby making it possible to process under the same conditions an additional wavelength $L_3$ recovered or transmitted by the fiber 11. In this case the wavelength $L_2$ reflected by the mirror 4 will undergo two filtrations from $L_1$ through the mirror 3 and two filtrations from $L_3$ through the mirror 10.

The four embodiments shown in FIGS. 3 to 6 share the characteristic that the transmission fiber 6 is applied to the first transparent block in a non-reflecting central zone of one face which otherwise forms a system which is totally reflecting, planar, concave, or is a grating for diffraction by reflection. At least some receiver fibers can thus be arranged on the opposite face of the device, offering thereby a very great advantage in the case where the device is also used to direct towards the fiber 6 a wavelength $L_1$ coming from a local emitter through a fiber 18, as shown in FIGS. 3 to 6.

The simplest device, shown in FIG. 3, has a structure which is very similar to that of FIG. 1, with two blocks 1 and 2 separated by a selective mirror 3 centered in the immediate vicinity of the end of the fiber 6. The mirror 3 is reflecting only for the wavelength band containing $L_1$. Thus the beam $L_1$ emitted by the fiber 18 is reflected at 3 and is focused on the end of 6 and all the light $L_1$ is introduced into the transmission fiber. On the other hand, the beam $L_2$ emitted by 6 passes through the mirror 3 without deflection, then reaches the mirror 14 which reflects it towards the plane mirror 15 at the entry face after another passage through 3. The radius of the mirror 14 is selected so that the final image of the end of the fiber 6, after the last reflection at 15 and a new passage through 3, is formed at the non-reflecting center of 14, where the receiver fiber 19 is situated.

It will first be noted that the wavelength $L_2$ undergoes three successive filtrations by its three passages through the mirror 3 between leaving 6 and entering 19. If then the fibers 18 and 19 are used as exit fibers after a separation of the two wavelengths of a mixed light delivered by 6, the two wavelengths undergo different degrees of filtration and an optical path can be assigned preferentially to a given wavelength.

It can also be noted, especially, that in the case where, as in FIG. 3, the light $L_1$ is an intense light coming from a nearby emitter and liable to generate stray light, such stray light is completely stopped, for the same reason as the direct light, by the barrier of the filter-mirror 3; the attenuated light $L_2$ recovered at the fiber 19 is therefore in no danger of being perturbed by stray light from the nearby emitter.

FIG. 4 differs from the preceding one only by the presence of an additional selective mirror 20 which makes it possible to segregate an additional wavelength $L_3$, with a triple filtration from $L_1$ at 3 and a triple filtration from $L_2$ at 20. The exits 19 and 21 therein are also completely protected by 3 against the stray light $L_1$.

The same applies with respect to FIG. 5 which differs from FIG. 4 only in a relative arrangement of the selective mirrors. The use of a spherical return mirror 25 in place of a plane mirror 15 enables the device to be more compact.

It will be noted with respect to FIG. 6 that the reflecting return device can also be a plane diffraction grating 26 operating by reflection. In this event it is the grating which separates the two wavelengths $L_2$ and $L_3$ recovered at 18 and 21, both with the same relative degree of filtration, and both completely protected against the stray light $L_1$.

In the embodiment shown in FIG. 7, the transmission fiber 6 carrying the two wavelengths $L_1$ and $L_2$ also terminates on the device at the non-reflecting center of a plane return mirror 15. In this case the end of the fiber 6 is still at the center of the mirror 3 with the result that the light $L_1$ which is reflected at 3 is immediately focused on the fiber 28 after only one filtration. On the other hand, the end of 6 is at the focus of the mirror 24; the light $L_2$ which has passed through 3 is returned as a parallel beam towards 15, which returns it again towards 24 for a final focusing on the fiber 29. The light $L_2$ has therefore in this case undergone four successive filtrations from $L_1$, by four passages through the selective mirror 3.

In the device of FIG. 7, the mirror 15 could also be replaced by a plane diffraction grating for an additional segregation of wavelengths under the same filtration conditions.

Naturally, one and the same device can combine two or more of the configurations described separately above. This has in fact been carried out on the device shown in FIG. 8. In this case the fiber 6 transmits from its other end the wavelengths to be collected $L_2=0.79$ microns and $L_3=0.87$ microns. The fiber 28 transmits from a nearby emitter the wavelength $L_1=0.83$ to be introduced into the fiber 6. The beam $L_2$ $L_3$ emerging from the fiber 6 meets first the selective spherical mirror 10 with a radius of 40 mm which has its focus at the entry of 6, and which forms a high-pass filter which is transparent to wavelengths greater than about 0.80 microns. The light $L_2$ is therefore reflected as a parallel beam returned by the mirror 15 and refocused by 10 on the exit fiber 29 after a double filtration by reflection.

The mirror 3 with a radius of 30 mm, centered on the end of the fiber 6, is also made into a high-pass filter which is transparent to wavelengths greater than about 0.85 microns. It is therefore traversed by the remainder of the beam emerging from 6, of wavelength $L_3$. The light $L_3$ which is reflected successively by the spherical mirror 14 with a radius of 53 mm and the plane mirror 15, is focused on the opposite fiber 21 after three passages through the mirrors 3 and 10. Finally the light $L_1$ from the fiber 28 and from the emitter passes through the mirror 10 but is reflected by the mirror 3 which immediately refocuses it on the fiber 6, after double filtration from $L_2$. It will be noted, in particular, that the light $L_3$, which is the most difficult to filter, in this case undergoes three filtrations through each selective mirror and is completely segregated by the mirror 3 from all stray light $L_1$ originating from the emitter.

We claim:

1. A multiplexer-demultiplexer, comprising:
   (a) a solid transparent member having first and second ends, said first end being configured and dimensioned to form a support for a focusing surface;
   (b) first reflective means, adjacent said first end, for forming a reflective focusing surface;
   (c) second reflective means adjacent said second end for forming a reflective surface;
   (d) first light conducting means for sending or receiving light, said first light conducting means being positioned proximate said second end and positioned at a first end of a path along which light is sent or received, said path extending from said first light conducting means toward said reflective focusing surface;
   (e) first color responsive focusing means positioned in said solid transparent member between said first and second ends of said solid transparent member for passing light of one wavelength and configured and dimensioned to reflect and focus light of another wavelength;
   (f) second light conducting means for receiving or sending light of said one wavelength which is sent or received by said first light conducting means, respectively, said second light conducting means being positioned proximate said second end and positioned at a first opposite path end of a first branching path, said first branching path extending from said first light conducting means to said first reflective means, from said first reflective means through said color responsive means to said second reflective means, from said second reflective means to said first reflective means, and from said first reflective means to said second light conducting means and proceeding in directions defined by rays of light of said one wavelength travelling between said first light conducting means and said second light conducting means; and
   (g) third light conducting means positioned at a second opposite path end of a second branching path, said second branching path extending from said first light conducting means to said color responsive focusing means and from said color responsive focusing means to said third light conducting means and proceeding in directions defined by rays of light of said other wavelength travelling between said first and third light conducting means.

2. A multiplexer-demultiplexer, as in claim 1, wherein said color responsive focusing means is proximate said first reflective means.

3. A multiplexer-demultiplexer as in claim 1, wherein said first reflective means contains a central portion which is not reflective.

4. A multiplexer-demultiplexer as in claim 1, wherein said color responsive focusing means passes one plurality of wavelengths and reflects another plurality of wavelengths.

5. A multiplexer-demultiplexer comprising:
   (a) a solid transparent member having first and second ends, said first end configured and dimensioned to form a support for a focusing surface;
   (b) first reflective means, adjacent said first end, for forming a relective focusing surface;
   (c) second reflective means adjacent said second end for forming a reflective surface;
   (d) first light conducting means for sending or receiving light, said first light conducting means being positioned proximate said second end and positioned at a first end of a path along which light is sent or received, said path extending from said first light conducting means toward said reflective focusing surface;
   (e) first color responsive focusing means positioned in said solid transparent member between said first and second ends of said solid transparent member for passing light of one wavelength and configured and dimensioned to reflect and focus light of an other wavelength;
   (f) second light conducting means for receiving or sending light of said one wavelength which is sent or received by said first light conducting means, respectively, said second light conducting means being positioned proximate said first end and positioned at a first opposite path end of a first branching path, said first branching path extending from said first light conducting means to said first reflective means, from said first reflective means through said color responsive means to said second reflective means, from said second reflective means to said second light conducting means and proceeding in directions defined by rays of light of said one wavelength travelling between said first light conducting means and said second light conducting means;

(g) third light conducting means positioned at a second opposite path end of a second branching path, said second branching path exending from said first light conducting means to said color responsive focusing means and from said color responsive focusing means to said third light conducting means and proceeding in directions defined by rays of light of said other wavelength travelling between said first and third light conducting means; and (h) a second color responsive focusing means positioned in said solid transparent member between said first color responsive focusing means and second end of said solid transparent member for passing light of said one and said other wavelength but reflecting light of a third wavelength and fourth light conducting means for receiving or sending light of said third wavelength which is sent or received by said first light conducting means, respectively, said fourth light conducting means being positioned proximate said first end and positioned at a fourth opposite path end of a fourth branching path, said branching path extending from said first light conducting means to said fourth light conducting means in directions defined by the path travelled by light of said third wavelength, and, wherein said first and second reflective means are concave mirrors.

6. A multiplexer-demultiplexer comprising:
(a) a solid transparent member having first and second ends, said first end being configured and dimensioned to form a support for a focusing surface;
(b) first reflective means, adjacent said first end, for forming a reflective focusing surface;
(c) second reflective means adjacent said second end for forming a reflective surface wherein said second reflective means is a planar mirror and said first reflective means is a concave mirror;
(d) first light conducting means for sending or receiving light, said first light conducting means being positioned proximate said second end and positioned at a first end of a path along which light is sent or received, said path extending from said first light conducting means toward said reflective focusing surface;
(e) first color responsive focusing means positioned in said solid transparent member between said first and second ends of said solid transparent member for passing light of one wavelength and configured and dimensioned to reflect and focus light of an other wavelength;
(f) second light conducting means for receiving or sending light of said one wavelength which is sent or received by said first light conducting means, respectively, said second light conducting means being positioned proximate said first end and positioned at a first opposite path end of a first branching path, said first branching path extending from said first light conducting means to said first reflective means, from said first reflective means through said color responsive means to said second reflective means, from said second reflective means to said second light conducting means and proceeding in directions defined by rays of light of said one wavelength travelling between said first light conducting means and said second light conducting means;

(g) third light conducting means positioned at a second opposite path end of a second branching path, said second branching path extending from said first light conducting means to said color responsive focusing means and from said color responsive focusing means to said third light conducting means and proceeding in directions defined by rays of light of said other wavelength travelling between said first and third light conducting means; and (h) fourth light conducting means positioned proximate said first end and positioned at a third opposite path end of a third branched path, said third branched path extending from said first light conducting means to said fourth light conducting means.

7. A multiplexer-demultiplexer, comprising:
(a) a solid transparent member having first and second ends, said first and second ends being configured and dimensioned to form concave focusing surfaces with the concave sides oriented toward each other;
(b) first reflective means adjacent said first end for forming a reflective focusing surface;
(c) second reflective means adjacent said second end for forming a reflective focusing surface;
(d) first color responsive focusing means oriented in a first direction for reflecting light of a first wavelength and transmitting light of second and third wavelengths positioned in said solid transparent member between said first and second ends and curved with the same orientation as said first reflective means;
(e) a second color responsive focusing means for transmitting light of said first and third wavelengths and reflecting light of said second wavelength positioned in said solid transparent member between said first color responsive focusing means and said second reflective means and oriented in a second direction, said second direction being opposite said first direction;
(f) first light conducting means positioned proximate said second end of said solid transparent member for light of a first wavelength;
(g) second light conducting means positioned adjacent said first light conducting means at the point where light of said first wavelength emitted from said first light conducting means is imaged by said first color responsive focusing means;
(h) third light conducting means for receiving light of a second wavelength and positioned at the point where light of said second wavelength is imaged after travelling from said second light conducting means through said first and said second color responsive focusing means by passing through said non-operative central portion of said second color responsive focusing means, to said first reflective means, from said first reflective means to said second color responsive focusing means, after reflecting from said second color responsive focusing means travelling to said third light conducting means; and
(i) fourth light conducting means positioned adjacent said third light conducting means at the point at which light of a third wavelength is imaged after being emitted by said second light conducting means, travelling through said first and second color responsive focusing means, to said first reflective means, from said first reflective means to said second reflective means and from said second reflective means to said fourth light conducting means.

8. A multiplexer-demultiplexer, comprising:
(a) a solid transparent member having first and second ends, said first end being configured and dimensioned to form a support for a focusing surface;
(b) first reflective means adjacent said first end for forming a reflective focusing surface;
(c) second reflective means adjacent said second end for forming a reflective surface;
(d) first light conducting means positioned proximate said second end of said solid transparent member;
(e) first color responsive focusing means positioned in said solid transparent member between said first and second ends of said solid transparent member for passing light of a second wavelength and reflecting light of a first wavelength;
(f) second light conducting means positioned to receive light of said first wavelength reflected and focused by said color responsive focusing means; and
(g) third light conducting means positioned to receive light of said second wavelength imaged by said first relective means at the input on to said third light conducting means.

9. A mulitplexer-demultiplexer as in claim 8, wherein said third light conducting means is located proximate said first reflective means and said light of said second wavelength travels from said first light conducting means to said first reflective means, from said first reflective means to said second reflective means and from said second reflective means to said third light conducting means.

10. A multiplexer-demultiplexer as in claim 8, further comprising a fourth light conducting means positioned adjacent said third light conducting means at a position where it can receive light of a third wavelength leaving from said second light conducting means to said first reflective means, from said first reflective means to said second reflecting means which is a diffraction grating and from said diffraction grating to said fourth light conducting means, said light of said fourth wavelength being imaged at the input of said fourth light conducting means.

11. A multiplexer-demultiplexer as in claim 8, wherein said second reflective means is a diffraction grating.

12. A mulitplexer-demultiplexer as in claim 11, wherein said diffraction grating is disposed at an angle with respect to the major axis of said solid transparent member and said focusing surface defines a center point, and wherein a perpendicular to said focusing surface passing through said center point is substantially in the same direction as said major axis.

* * * * *